United States Patent
Beadle et al.

(10) Patent No.: US 6,606,317 B1
(45) Date of Patent: Aug. 12, 2003

(54) DUAL KEY CONTROLLED CONTENT ADDRESSABLE MEMORY FOR ACCESSING PACKET SWITCH DATA BUFFER FOR MULTICASTING DATA PACKETS

(75) Inventors: Edward R. Beadle, Melbourne, FL (US); John F. Dishman, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/391,919

(22) Filed: Sep. 9, 1999

(51) Int. Cl.[7] .......................... H04L 12/56; G06F 12/00

(52) U.S. Cl. .................. 370/390; 370/432; 370/395.71; 711/108

(58) Field of Search ................................. 370/351, 389, 370/390, 395.1, 395.3, 395.7, 395.72, 412, 413, 419, 432, 475, 395.71; 711/100, 108

(56) References Cited

U.S. PATENT DOCUMENTS

| | | | |
|---|---|---|---|
| 4,065,756 A | 12/1977 | Panigrahi ...................... 365/49 |
| 4,219,883 A | 8/1980 | Kobayashi et al. ........... 365/49 |
| 4,959,811 A | 9/1990 | Szczepanek .................. 365/49 |
| 5,010,516 A | 4/1991 | Oates ........................... 365/49 |
| 5,018,099 A | 5/1991 | Burrows ...................... 365/49 |
| 5,455,784 A | 10/1995 | Yamada ........................ 365/49 |
| 5,528,588 A | * | 6/1996 | Bennett et al. .............. 370/396 |
| 5,566,170 A | * | 10/1996 | Bakke et al. ................ 370/392 |
| 5,689,505 A | * | 11/1997 | Chiussi et al. ............... 370/388 |
| 5,732,087 A | * | 3/1998 | Lauer et al. ................. 370/416 |
| 5,813,040 A | * | 9/1998 | Rathke ......................... 711/156 |
| 5,898,687 A | * | 4/1999 | Harriman et al. ........... 370/390 |
| 5,909,686 A | * | 6/1999 | Muller et al. ............. 707/104.1 |
| 5,940,392 A | * | 8/1999 | Lo et al. ...................... 370/392 |

(List continued on next page.)

OTHER PUBLICATIONS

Chisvin et al. Content–Addressable and Associative Memory: Alternatives to the Ubiquitous RAM. IEEE Computer. Jul. 1989. pp. 51–64.*

RAM versus CAM. IEEE Potentials. Apr.–May 1997. pp. 26–29.*

Schultz et al. CAM–BAsed Single–Chip Shared Buffer ATM Switch. IEEE Communications. May 1–5, 1994. pp. 1190–1195.*

*Primary Examiner*—Melvin Marcelo
*Assistant Examiner*—Derrick W Ferris
(74) *Attorney, Agent, or Firm*—Allen, Dyer, Doppelt Milbrath & Gilchrist, P.A.

(57) ABSTRACT

An output port centric digital data management architecture for a high speed packet switch employs a dual key-based content addressable memory (CAM)-based buffer access control mechanism for efficient storage and read out of relatively long data packets to one or more output ports of the switch. The CAM stores respectively different address pointer words, each containing a respectively different key field to identify a data packet to be delivered to a switch output port, and an address field that identifies the address of one of the storage locations of the packet buffer in which the data packet is stored. During a first portion of a dual key CAM search, a packet request key is coupled to the key fields of all address pointer words stored in the CAM. The location of the matching key is used to access the key field's companion address field in its address pointer word during a second portion of the dual search of the CAM. During this second search, the accessed address field is read out so as to access a data packet stored in the packet buffer, and is also simultaneously coupled to address fields of all the address pointer words stored in the CAM. In response to this second search, the CAM outputs a signal representative of whether the accessed address field is contained in the address field of another address pointer word stored in the CAM, thereby indicating whether or not the buffer address from which the packet has been accessed is free to store new data.

25 Claims, 6 Drawing Sheets

U.S. PATENT DOCUMENTS

| | | | |
|---|---|---|---|
| 5,949,781 A | * 9/1999 | Lincoln et al. | 370/395.4 |
| 6,091,725 A | * 7/2000 | Cheriton et al. | 370/392 |
| 6,101,187 A | * 8/2000 | Cukier et al. | 370/396 |
| 6,101,554 A | * 8/2000 | Creedon et al. | 709/253 |
| 6,128,654 A | * 10/2000 | Runaldue et al. | 709/219 |
| 6,167,051 A | * 12/2000 | Nagami et al. | 370/397 |
| 6,208,544 B1 | * 3/2001 | Beadle et al. | 365/49 |
| 6,226,685 B1 | * 5/2001 | Chen et al. | 709/238 |
| 6,247,058 B1 | * 6/2001 | Miller et al. | 709/234 |
| 6,308,218 B1 | * 10/2001 | Vasa | 709/238 |
| 6,343,078 B1 | * 1/2002 | Bronstein et al. | 370/400 |

* cited by examiner

DUAL KEY CONTROLLED CONTENT ADDRESSABLE MEMORY FOR ACCESSING PACKET SWITCH DATA BUFFER FOR MULTICASTING DATA PACKETS

CROSS-REFERENCE TO RELATED APPLICATIONS

The present application relates to subject matter disclosed in coincidentally filed U.S. patent application, Ser. No. 09/391,918, by E. Beadle et al, entitled: "Content Addressable Memory Cell Providing Simultaneous Read and Compare Capability" (hereinafter referred to as the '918 application), assigned to the assignee of the present application and the disclosure of which is incorporated herein.

FIELD OF THE INVENTION

The present invention relates to communication systems, and is particularly directed to a new and improved output port centric digital data management architecture for a high speed packet switch, that employs a dual key-based content addressable memory (CAM)-based buffer access control mechanism to effect high efficiency storage of (relatively long) data packets, and distribution of an individually stored packet to one or more output ports of the switch.

BACKGROUND OF THE INVENTION

Continuing improvements in speed and bandwidth efficiency of digital signal processing components have enabled telecommunication service providers to supply multiple types of signalling channels from one or more sourcing sites to a switching interface serving a number of destination equipments. Accompanying these improvements has been the need for increased storage and data delivery capacity of the data switching and distribution elements that make up the switching interface. In a high data rate/capacity terrestrial system this has typically been accomplished in a brute force fashion, by using a very large (e.g., room-sized) data buffering subsystem, having separate (maximal capacity) data stores dedicated to each port being serviced. Because of its extraordinarily large size and considerable power requirements, this type of a data storage and distribution subsystem is not only impractical, but effectively impossible to deploy in an airborne or spaceborne environment, where payload power consumption parameters must comply with very limited specifications.

SUMMARY OF THE INVENTION

In accordance with the present invention, this problem is successfully addressed by a new and improved output centric packet switch architecture that employs a dual key content addressable memory (CAM)-based data storage management mechanism, which is configured to control, in a highly efficient manner, the storage and distribution of received data packets to one or more output ports of a P input port, M output port packet switch. The respective P input ports of the switch are coupled to asynchronous data links that transport packetized digital data from a variety of data sources from upstream modulation and demodulation and associated carrier interface components, such as, but not limited to those employed at the front end of a satellite communication system. As will be described, the size of a nominal data packet is presumed to be relatively long (e.g., in excess of 300 bytes, as a non-limiting example).

The P input ports of the switch are coupled to an input packet buffer that serves as a temporary holding queue, to allow for analysis/decoding of header information in each received packet, and thereby determine whether a respective packet is to be distributed to one or more of the M output ports of the switch or discarded. The packet header is coupled to a look-up table, which is interfaced with the switch's host processor and a packet buffer access controller, which supplies control and timing signals to the various components of the switch. If the header of a received packet indicates that the packet is to be supplied to one or more of the switch output ports, the packet is coupled through a P:1 'packet'-multiplexer and loaded into an output packet buffer. A packet record is stored in only a single storage location of the output packet buffer. This enables the capacity of the packet output buffer to be reduced considerably relative to the capacity of conventional data memories, which store a separate copy of the data for each output port to which the packet is to be delivered. This storage space reduction is particularly significant for multicasting relatively long packets.

When a packet is written to the output packet buffer, the header information is mapped by the look-up table and packet tag generator—controller into a multi-field buffer address pointer word, that is written to one or more (for multicasting) addresses of a dual key controlled content addressable memory (CAM). A significant aspect of the present invention is the fact that each output packet buffer address pointer word stored in the CAM contains two key fields:—a K bit 'key' field and a companion N bit 'address association' field. The K bit 'key' field is defined in accordance with a destination output port, quality of service information and the age of the packet and is generated by the packet tag generator—controller. The N bit 'address association' field points to the address within the output packet buffer where that packet is stored. Because the length of a respective buffer address pointer word is considerably smaller than that of a packet, the amount of memory required to implement the CAM is considerably less than that of the output packet buffer.

When a packet is to be written into the output packet buffer, the address of a free storage location within the output packet buffer is obtained from a free address table (FAT), which tracks the addresses of the output packet buffer that are 'available' or 'free' to store a new packet. The FAT contains a list of addresses for the free or available packet storage locations in the output packet buffer. As a new packet arrives, a free address is retrieved from the FAT. Once the packet has egressed through all appropriate output ports, the address in the location where the packet was stored will be returned to the FAT.

Since each key field stored in the CAM identifies the address within the output packet buffer where the requested packet is stored, an associative search of the CAM using that key will access the contents of the address association field that point to the address of the output packet buffer where the requested packet is stored. In response to a match of the K bit key field, the contents of its companion N bit address association field are read out and used to access the packet from the output packet buffer, for delivery to a switch output port.

The N-bit address association field is then used to search for other instances of the same address in the CAM to determine if the packet is required for pending egress to a multi-cast destination on a different output port. If no other instances of the same address are found in the CAM, the address is returned to the FAT as a free address.

Within the CAM itself, the dual key buffer address pointer words are organized as an array of words, similar to random access memories, which reduces the complexity of address decoders for read/write access and data association. All of the key match outputs of a respective row of words are coupled to a respective row OR gate, and all of the key match outputs of a respective column of words are coupled to a respective column OR gate, so as to form row and column addresses.

Within the CAM, the K+N bit words are physically organized as an array similar to random access memories. This reduces the complexity of address decoders for read, write, and compare operations. Each K+N bit word contributes data lines to indicate matches to its respective fields. The K-bit field contributes a "match" output to row and column decoders. Typically these decoders take the form of "or-gates". The decoded row and column from the K-bit field is used directly to access the associated N-bit data field. When the N-bit associated data field is used as the "key" for the second search, (i.e. to determine multi-cast), only a single indication of multiple instances of the address in the other association field is necessary. Hence, the N-bit association fields can be "or-ed" by either row or column since we only need to know if there are other instances of the same address or not.

DETAILED DESCRIPTION

Figure 1:
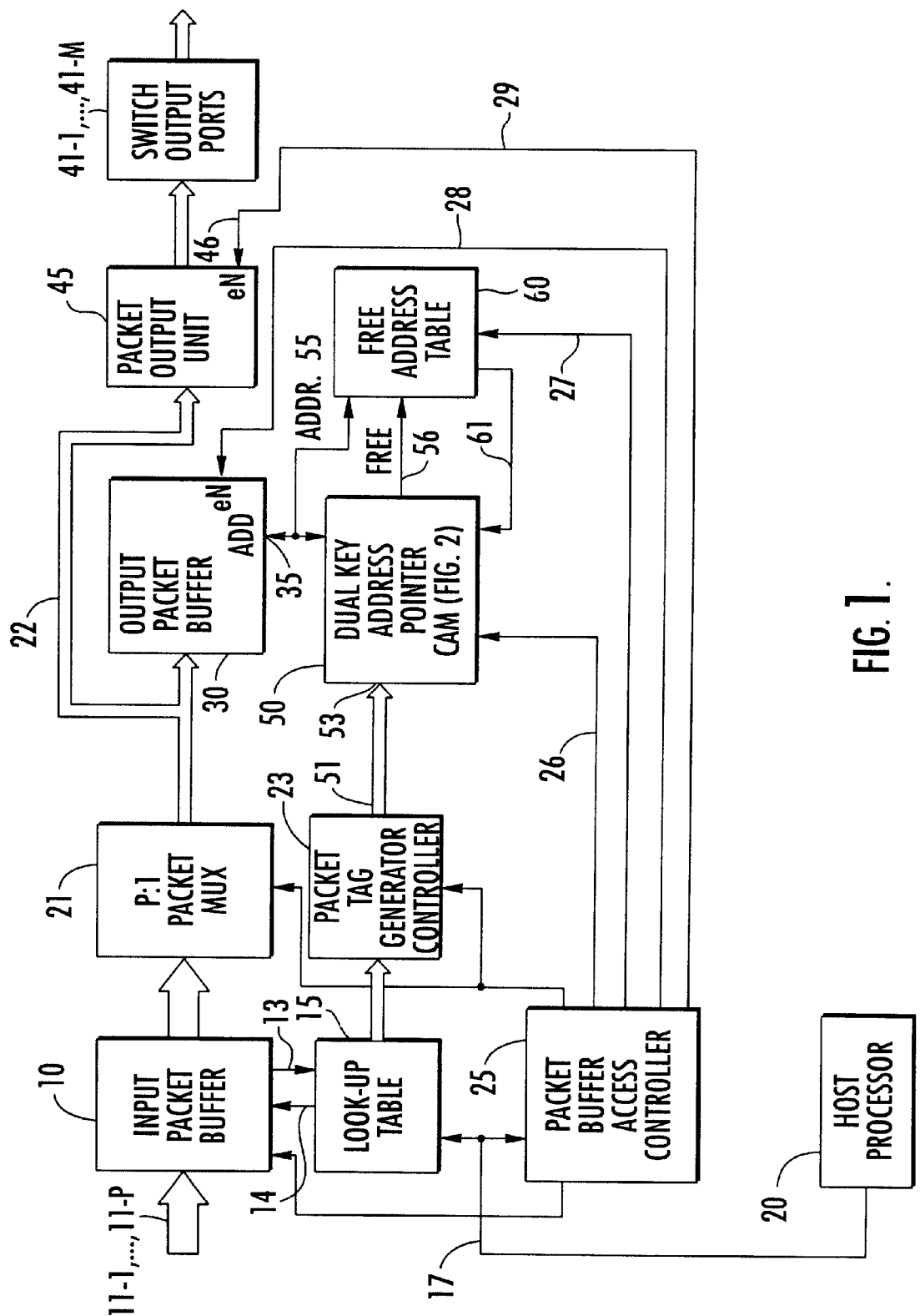
FIG. 1 diagrammatically illustrates the overall architecture of an embodiment of a P:M output-centric packet switch, that employs a dual key-based content addressable memory (CAM)-based buffer access control mechanism of the present invention.

Before describing in detail the new and improved dual key CAM controlled output centric packet switch architecture of the present invention, it should be observed that the invention resides primarily in prescribed modular arrangements of conventional digital communication circuits and associated digital signal processing and data storage components and attendant supervisory control circuitry therefor, that controls the operations of such circuits and components. In a practical implementation that facilitates their being packaged in a hardware-efficient equipment configuration, such as may be carried by an aircraft or spacecraft, these modular arrangements may be readily implemented as field programmable gate array (FPGA), or application specific integrated circuit (ASIC) chip sets.

Consequently, the configuration of such arrangements of circuits and components and the manner in which they are interfaced with other telecommunication equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the invention in a convenient functional grouping, whereby the present invention may be more readily understood.

Referring now to FIG. 1, the overall architecture of an embodiment of a P:M output-centric packet switch of the present invention is diagrammatically illustrated as comprising an input packet buffer 10, to which packetized digital data is supplied from a variety of data sources from upstream modulation and demodulation and associated carrier interface components, such as, but not limited to those employed at the front end of a satellite communication system. For this purpose, the input buffer 10 is coupled to a plurality of multibit (e.g., byte-wide) asynchronous data links 11-1, . . . , 11-P, over which the packetized digital data transported. The size of a nominal data packet is presumed to be relatively long (e.g., 376 bytes, as a non-limiting example). The input packet buffer 10 may be configured as a double buffer, in order to support pipeline processing on a packet-by-packet basis. Where the data channels on the input links are synchronized, double buffering may not be required.

It should be noted that the particular external communication parameters (including carrier frequencies, modulation format, data transport protocol, and the like) associated with the communication system components that interface to (input or output ports of) the switch are not germane to the architecture and associated CAM-based storage management subsystem of the present invention and will not be described here. To support an aggregate data input rate of 15 Gbps, as a non-limiting example, the data links to the input buffer 10 may comprise a set of (P=) five, eight bit wide, data links respectively clocked at 375 MHz.

The input packet buffer 10 serves as a temporary holding queue for the respective input data packet streams received from the data transport links 11-1, . . . , 11-P, to allow for analysis/decoding of header information in each received packet, and thereby determine whether a respective packet is to be further processed ('stored and shipped'), or discarded. For this purpose, the header portion of each received data packet is coupled over a link 13 to a multiplexer-controlling look-up table (LUT) 15, which is interfaced over link 17 with a host processor 20 and a packet buffer access controller 25. The packet buffer access controller 25, which may be implemented as a state machine comprised of combinational logic and flip-flops, is operative to supply control and timing signals to the components of the switch, through which received packets are controllably written into an output packet buffer 30, and selectively read out therefrom to one or more of a plurality of M switch output ports 41-1, . . . , 41-M.

For this purpose, the LUT 15 reads packet header information, to determine whether a received packet of interest is to be supplied to any of the switch output ports 41-1, . . . , 41-M. If so, the packet is controllably coupled through a P:1 'packet'-multiplexer 21 over a J bit wide intra-switch packet link 22 to an output packet buffer 30. On the other hand, should the address information within the header of the packet temporarily stored in the input buffer 10 indicate that the packet is not intended for any of the M output ports of the switch, the packet is simply discarded (for example using a null cycle of the multiplexer timing control via control link 14). To provide for increased buffer access cycle times, the width (J) of the intra-switch packet link 22 may be relatively large (e.g., J=256 bits, as a non-limiting example), to allow the use of a reasonably reduced speed packet bus clock (e.g., on the order of 60–70 MHz aggregate, or 12–14 MHz for each of the P=5 input links to the packet multiplexer 21).

As pointed out briefly above, since a respective packet is stored in no more than a single storage location of the output packet buffer 30, the capacity of the packet output buffer can be reduced considerably relative to the capacity of conventional data memories, which store a separate copy of the data for each switch output port to which a packet is to be delivered. This storage space reduction is particularly significant where the size of a packet is relatively long, so that having to store separate copies of a given packet would require a memory capacity of a prohibitive size for airborne or spaceborne applications.

The header information of a packet that is intended for one of the switch output ports 41 is mapped by the LUT 15 into a multibit address pointer word. A respective address pointer word output by the LUT 15 is controllably coupled over a multibit link 51 through a P:1 address pointer multiplexer 23 to enable input ports 53 of a dual key controlled content addressable memory (CAM) 50. The steering operation of the address pointer multiplexer 23 is (electronically-ganged) or synchronized with that of the packet multiplexer 21, so that as a respective data packet is stored in the output packet buffer 30, an associated address pointer word supplied by the LUT 15 may be supplied to the CAM 50.

M bits of a respective address pointer word output by the LUT 15 are used to 'point' to one or more of the M output ports 41-1, ..., 41-M of the switch, to which a packet is to be delivered. Whenever a multicast packet is encountered, plural ones of the M bits of the address pointer word will be asserted active (in association with those output ports to which the packet is to be multicast), in association with which the CAM 50 will store plural address pointer words in respective storage locations thereof. The remaining bits (e.g., three bits as a nonlimiting example), are used to encode one of plural qualities of service (QoS) associated with the packet.

Within the CAM 50, this port and QoS information is employed in conjunction with the 'age' of the packet (namely, how long the packet has been stored in the output buffer memory), to generate a respective K bit 'key' field portion of a K+N bit dual key buffer address pointer word. Each dual key buffer address pointer word stored in the CAM 50 uniquely specifies an individual packet, and also identifies the address within the output packet buffer 30, where that packet is stored. The key field portion has a companion N bit 'address association' field portion, that points to the actual address of the storage location within the output packet buffer 30 in which the packet of interest is stored.

The overall bit length (e.g., three bytes) of a respective (K+N bit) dual key buffer address pointer word is considerably smaller (e.g., more than one order of magnitude) than the length of a packet (e.g., 376 bytes), so that even assuming some degree of multicasting of every packet stored in the output packet buffer 30, the amount of memory space required to implement the CAM 50 is considerably less than that of the output packet buffer 30. As a non-limiting example, for an address pointer queue depth of 8192 packets/switch output port, a total of M=16 switch output ports yields a storage CAM storage requirement of 128K times the size of a packet. For the present example of a packet size of 376 bytes, the required memory capacity is nominally 48 MB. Organizing the output packet buffer as 256 bits (eight stacks wide) provides 16 Meg storage locations; however, nominally only 1.5 Meg storage locations are required.

Whenever a packet is to be written into the output packet buffer 30, not only must there be an available or free storage location within the output packet buffer 30 to write the packet, but the address of such available storage space must be known. This information is maintained in a free address table (FAT) 60. The FAT 60 is coupled via an address link 55 to an address port 35 of the packet buffer 30. The identity of the next free address of the output packet buffer 30 in which a new packet may be written is supplied to the CAM 50 over a 'next free address' line 61 from a free address table (FAT) 60. The FAT 60 receives control signals via a control link 27 from the packet buffer access controller 25.

A 'free' indication line 56 is used by the CAM 50 to inform the FAT 60 whether an address within the output packet buffer 30, from which a packet has been read out, is available for the storage of a new packet, and therefore may be marked as 'free'. To this end, the FAT 60 contains a list of each of the 'free' addresses of the output packet buffer 30.

As described above, the packet buffer access controller 25 supplies timing and control signals to the components of the switch, including clock and read and write enable signals to the various memory and multiplexer units. It is also operative, in response to packet request control signals from the supervisory host processor during a packet read-out cycle, to supply read-out keys over link 26 to the key fields of the address pointers stored in the CAM 50. Since each K-bit key field in the CAM 50 is associated with an N-bit associative field that identifies the address within the output packet buffer 30 where the requested packet is stored, a search of the key fields of the CAM using that key will readily access the contents of the address association field within the CAM that contain the address for the output packet buffer 30 where the requested packet is stored.

This accessed address information is coupled over address link 55 to the address port 35 of the output packet buffer 30. In conjunction with a read enable signal on the read/write control line 28 from the packet buffer access controller 25, this CAM-sourced address information causes the packet stored in the accessed packet buffer address to be read out onto the intra-switch packet link 22 and coupled to a packet output unit 45. The packet output unit 45 includes a cascaded arrangement of a parallel-to-serial output buffer and a 1:M demultiplexer coupled to the switch output ports 41-1., , , , . 41-M. Read/write enable, and steering control signals for controlling the operation of the output unit 45 are supplied over link 29 from packet buffer access controller 25.

As noted earlier, a significant aspect of the present invention is the fact that a respective dual key buffer address pointer word stored in the CAM 50 contains a pair of separate, but companion, key and address association fields, each of which is subjected to its own content-comparison operation, whenever a packet buffer read-out request is initiated by the packet buffer access controller 25. The first component of the dual key search is a search of the K bit wide key field of each K+N bit wide storage location of the CAM 50, using the read-out key supplied from the packet buffer access controller as the search reference.

In response to a match of the K bit key field of a CAM stored dual key buffer address pointer word with the supplied read-out key, the contents of its companion N bit address association field are read out, in order to access the packet from the output packet buffer 30, for delivery to an output port. In addition, the match result of the first CAM search is stored in an associated table, which may be maintained by address generator logic within the CAM 50, to mark or 'tag' that particular physical CAM location as having been accessed or used. This tag serves to indicate whether the CAM storage location is available to store a new address pointer word associated with a new packet.

The second component of the dual key controlled comparison operation is a search of the N bit wide address association field of each K+N bit wide storage location of the CAM 50. During this second search, the address association contents of the buffer address pointer word for which a match was obtained during the first search is used as the comparison reference. The purpose of this second search is to determine whether or not the CAM 50 contains yet another buffer address pointer word associated with a yet-to-be-fulfilled request for that same packet; namely, whether it contains another buffer address pointer entry whose address association field points to the same packet output buffer address, for which no previous key search has found a match.

Figure 8:
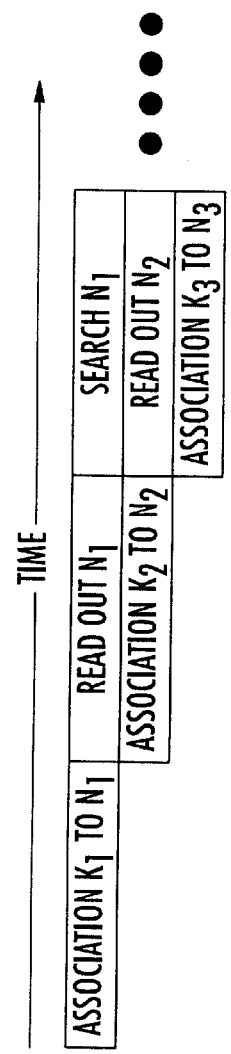
FIG. 8 is a flow diagram associated with the accessing of a packet from the output packet buffer simultaneously with a search of the dual key CAM.

As noted previously, configuring the CAM 50 in the manner described in the above-referenced '918 application enables the dual key and associative field searches and read operations to be performed simultaneously. This expedites reading out the contents of the N bit address association field within a buffer address pointer word for which a match of its companion K bit key field with that supplied read-out key was produced during the first CAM search. As illustrated in the flow diagram of FIG. 8, this facilitates rapidly accessing that packet from the output packet buffer 30, at the same time that the CAM is being searched to determine whether the packet buffer address of interest can now be marked as free.

If the result of the second query returns a match, then it is inferred that the CAM 50 still contains another buffer address pointer word associated with a yet-to-be-fulfilled request for that same packet, so that its packet buffer address within the packet buffer 30 is not yet available or 'free' to store a new packet. On the other hand, if the result of this second query fails to return a match, then it is inferred that the packet buffer address for which the association field search query has been asserted during the second search is now available to store a new packet, and is returned to the FAT 60 by asserting the free address indicator 56.

Figure 2:
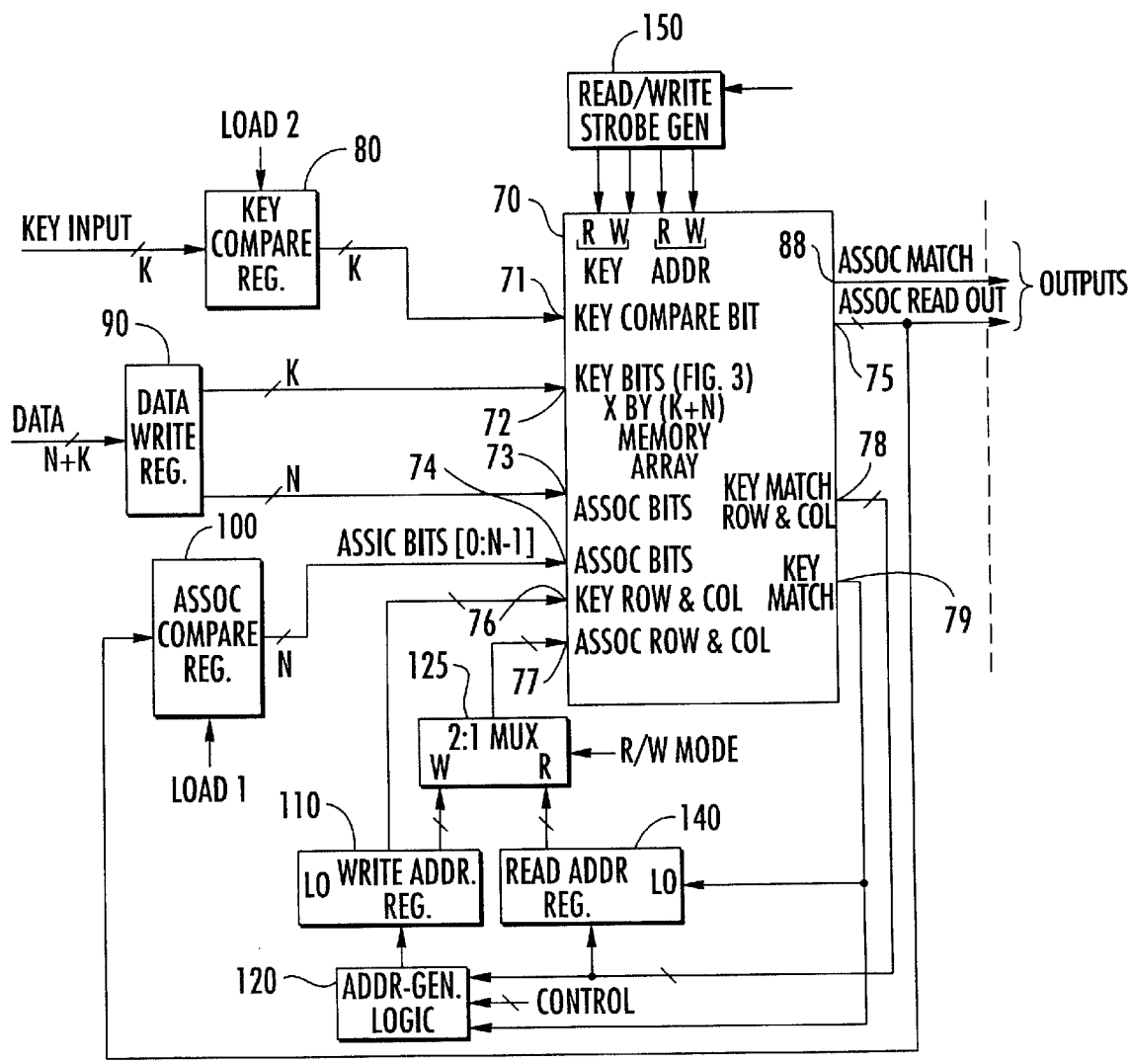
FIG. 2 diagrammatically illustrates the architecture of a dual key CAM.
Figure 3:
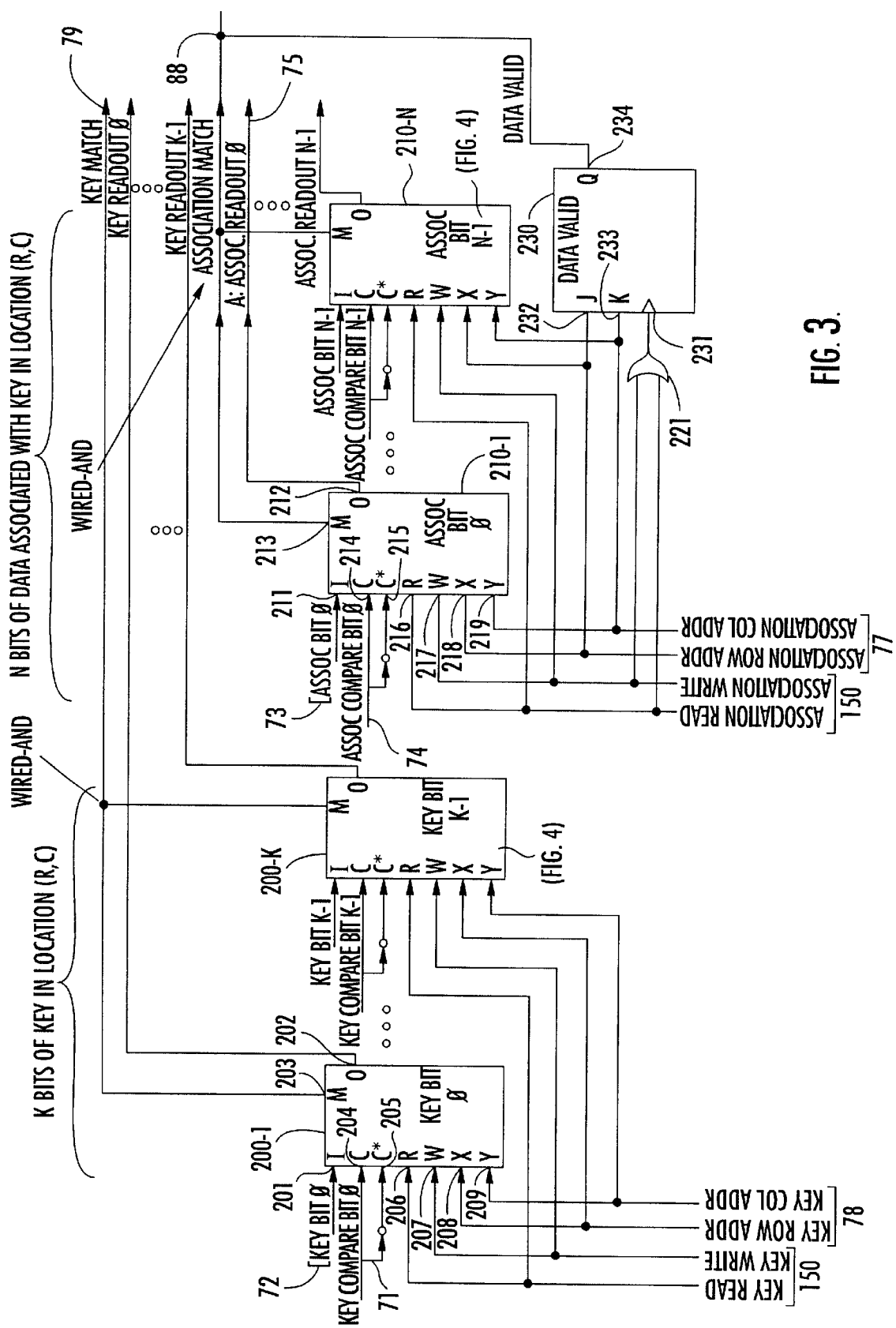
FIG. 3 shows the manner in which K+N memory cells of the dual key CAM of FIG. 2 are organized to form a respective dual key buffer address pointer word.

The architecture of the dual key CAM 50 is diagrammatically illustrated in FIG. 2 as comprising an X by (K+N) memory cell array or matrix 70, in which the word depth X is set by the application. The number of words X may be divided evenly into the number of queues for a given application. Alternatively, for dynamic sharing of CAM resources, the number of words X may comprise a 'pooled' resource when one queue could effectively use all the array locations, for enhanced flexibility. The matrix 70 of content addressable memory cells is preferably configured as detailed in the above-referenced '918 application. FIG. 3 shows the manner in which plural ones (K+N) of such memory cells are organized to form a respective dual key buffer address pointer word. The dual key buffer address pointer words, in turn, are organized into arrays of words within the memory, as shown diagrammatically in FIG. 5, to be described.

The memory cell array 70 has a key compare input port 71 coupled to receive the contents of a key comparison word register 80, to which a K bit key reference word from the packet buffer access controller 25, representative of the packet to be accessed from the output packet buffer 30, is supplied. The key reference word is loaded into the key comparison register 80 in accordance with a load control signal from the packet buffer access controller. A K bit key field input port 72 of the CAM array 70 is coupled to receive the K bit key portion contents of a key word data write register 90, to which a K+N buffer address pointer word is supplied, for storing a K-bit key and N-bit address associative field during a write operation.

An N bit wide portion of the key word stored in key word data write register 90 contains the identification of a packet output buffer address, that is supplied from the list of packet output buffer addresses maintained by the FAT 60, as described above. This N bit wide portion of the (K+N bit wide) buffer address pointer word is coupled to an N bit wide association field input port 73 of CAM array 70.

An N bit wide association compare input port 74 is coupled to receive the contents of an association field compare register 100, to which an N bit association reference word from an association read output port 75 is supplied. The association field is loaded into the association field comparison register 100 in accordance with a load control signal from the packet buffer access controller 25. This serves to provide the facility to search the N-bit association fields for other instances of the current N-bit association being read-out for accessing the desired packet stored in the output packet buffer.

The CAM memory array 70 also includes a key field row and column input port 76 that are coupled to a write address register 110. The write address register 110 receives inputs, namely the row and column (i.e. the CAM physical address), to write a K+N bit word during a CAM write cycle. As part of the write operation, the address generation logic 120 supplies the next CAM address in the memory array to be used. Further control of the address generation logic 120 is accomplished via a number of control lines which are necessary for the management of the addressing in the write modes and are under control of the Packet Buffer Access Controller 25. In the write mode, the 2:1 address mux 125 accepts the same row and column address driven into port 76 for accessing the key field for accessing the associated N-bit association field through port 77. When the write is commanded via Read/write strobe control 150, the contents of the K+N bit data write register are placed into the proper K and N bit fields through ports 72 and 73 CAM memory 70 to the location selected by the row and column addresses supplied on ports 76 and 77. To control the mux mode a R/W Mode (i.e. read/write mode) control line is used. This signal could be generated by the Packet Buffer Access Controller 25. When it is desired to read from the array, the 2:1 mux 125 selects the output of the Read Address Register 140 under control of the R/W Mode line. Register 140 accepts as input the row and column address of the key matching the key input previously stored in 80. The Read Address Register is "loaded" when the Key Match line 79 is asserted. This occurs when the key loaded into 80 identically matches a key field in the CAM memory array. Additionally this information, the key row and column from port 78 and the key match condition indicated from port 79, are used by the Address Generation Logic 120 to track locations to be freed as they are individually accessed in the in the CAM array 70. Each time an N-bit key matches the a new key input on port 71 the CAM array location is to be freed for overwriting at some later time as deemed necessary under the rules designed into the address generation logic 120. Continuing in the read operation, the N bit data stored in the row and column address pointed to by the Read Address Register 140 is fed through the 2:1 mux 125 into the Association Row and Column port 77. The result is that the desired N-bit association data will be output on 75 of the memory array 78. The Association Readout port 75 is coupled to the Association Compare Register 100. The register holds the N-bit data (which is the address of the next packet to be read from the Output Packet Buffer 30) for a second search to determine if any other instances of the current N-bit association field exist in the memory array. If they do then the packet has not been served to all the ports and the multicast is not complete. In this case the Association Match port 88 of the Memory Array 70 is not asserted. The Association Match line 88 is used to control the FREE indicator 56. In other words, if no Association match occurs during a second read (i.e. Association Match is low), then the current address can now be marked as available, and placed into the FAT 60 by asserting the FREE line 56 from the Dual Key CAM 50. Returning to the compare mode, under control from the Packet Buffer Access Controller 25, the Association Compare Register is loaded with the current output of port 88 when the LOAD 1 line is asserted. The contents of 100 are then applied to the CAM memory array 70 through port 74 to search for exact N-bit matches in each N-bit association field. Thus the association field from the first search to look-up a new packet address, has become a key to search for other remain instances of the same address. This is the dual key operation. In the search for "yet to be serviced" multicast outputs only an indication of the presence of instances of the address is required, hence the single line Association Match output port 88.

FIG. 3 shows the organization of a plurality of CAM cells as a respective dual key buffer address pointer word. For purposes of providing a non-limiting example, the illustrated dual key address pointer word is shown as being formed of a plurality of 'row'-resident bit cells. It should be observed, however, that a respective dual key buffer address pointer word may be formed of a plurality of memory cells disposed in a column of the memory cell matrix. As shown in FIG. 3, the key field portion of a buffer address pointer word contains a plurality K of key field bit cells 200-1, . . . , 200-K, and a companion plurality N of association field bit cells 210-1, . . . , 210-N. The configuration of a respective one of each of the key field bit memory cells 200 and association field bit memory cells 210 is diagrammatically shown in FIG. 4, to be described, which corresponds to FIG. 3 of the above-identified '918 application.

As shown in FIG. 3, within the key field portion of a dual key buffer address pointer word, a respective key bit memory cell 200 has a data input port 201 coupled to receive a respective key bit supplied to the CAM array's key field input port 72, and a data output port 202, from which the stored key bit can be read out. (It should be noted that the key bit data output port 202 shown in the drawing is not used, but is only shown for completeness, as the key bit and associated bit storage cell are identical.)

A key match port 203 is coupled to the key match output port 79, and is used to indicate the occurrence of a match between the key bit stored in the cell and the value of a key comparison bit applied to the key compare input port 71. The key comparison bit is coupled to a comparison port 204, the complement of which is coupled to a key bit complement comparison port 205. Read and write ports 206 and 207 are respectively coupled to receive key read and write strobe signals from the strobe generator 150, referenced above. Respective key row and column address ports 208 and 209 are coupled to receive respective key row and column address signals from the write address register 110.

A respective address association field bit memory cell 210 of the address association field portion of the dual key address pointer word has a data input port 211 that is coupled to receive a respective association bit supplied to the CAM array's association field input port 73, and a data output port 212 from which the stored association bit is read out for application to output port 75. An association match port 213 is coupled to the association match output port 88, and is used to indicate the occurrence of a match between the association bit stored in the bit cell and the value of an association comparison bit applied to the association compare input port 74. The association comparison bit is coupled to a comparison port 214, the complement of which is coupled to the complement bit comparison port 215.

Respective read and write ports 216 and 217 are coupled to receive association read and write strobe signals from the strobe generator 150, and also to an OR gate 221, the output of which is coupled to a clock input 231 of a data valid J-K flip-flop 230. A respective association bit cell further includes row and column address ports 218 and 219, that are coupled to receive respective association row and column address signals from the 2:1 multiplexer 125. These row and column address ports are also respectively coupled to the J and K inputs 232 and 233 of the data valid flip-flop 230. The Q output 234 of the data valid flip-flop 230 is wire-ANDed with the association field match output ports 213 to the association match output port 88 of the CAM array 70. The flip-flop is used to indicate valid data is stored in the associated K+N bit CAM word (Q=1). When writing to this word, J=K=1 and the port 231 is pulsed active. When reading the word, J=K=1, Q=1, then the port 231 is pulsed causing Q=0. This pulls port 88 low and prevents any further association matched from this word.

Figure 4:
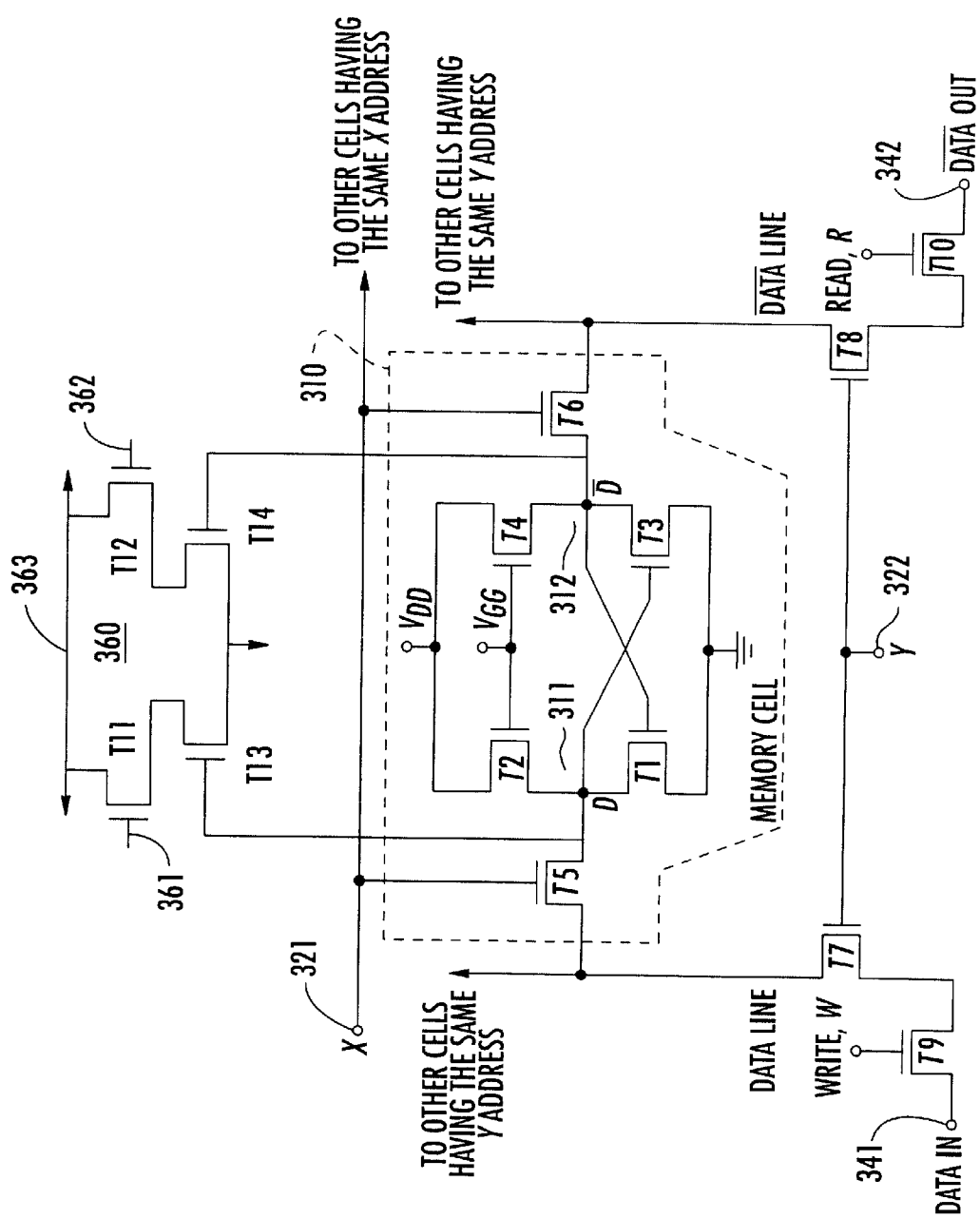
FIG. 4 corresponds to FIG. 3 of the above-identified '918 application, and diagrammatically illustrates the configuration of a respective content addressable bit memory cell having simultaneous read and compare capability.

Referring now to FIG. 4, the configuration of an individual bit cell of which each of the key field and address association field memory cells 200 and 210 of the CAM memory 70 is shown as comprising a metal oxide semiconductor (MOS) transistor-configured bit cell 300, comprised of a pair of cross-connected inverters 311 and 312. This cross-coupled pair of inverters 311–312 is coupled to power supply rails $V_{DD}$, $V_{GG}$ and ground (GND), and has complementary data bit nodes D and D BAR that store complementary bit logic levels representative of the data bit stored in the cell.

Although the illustrated embodiment is that of a static RAM, from the description herein it will be readily appreciated that the cell configuration is equally applicable to a dynamic RAM architecture. Moreover, although shown as a metal oxide semiconductor (MOS) transistor-configured CAM cell, it should be observed that the CAM cell of FIG. 4 may be implemented using other components, such as but not limited to bipolar devices, biCMOS devices, and the like.

MOS transistors T1 and T2 are the respective drive and load transistors of inverter 311, while MOS transistors T3 and T4 are the respective drive and load transistors of the other inverter 312. Within the CAM memory array 70, the X and Y locations, and therefore the address, of a bit cell are defined by an X or row node 321 coupled to the X address node of other bit cells of the same row of the array, and a Y or column node 322 coupled to the Y address node of other bit cells of the same column of the array.

The X node 321 is coupled to the gates of row address transistors T5 and T6, which have their source-drain paths coupled between respective data nodes D and D BAR and complementary Data and Data BAR lines 331 and 332. The Data and Data BAR lines 331 and 332 are coupled to other memory cells of the same Y column of the memory array. The Y node 322 is coupled the gates of column address transistors T7 and T8, which have their source-drain paths respectively coupled in circuit with the source-drain path of a data input (or write) transistor T9 and a data output (or read) transistor T10.

To store or write data into the bit cell, the source-drain path of data input transistor T9 is coupled to a data input (Data in) node 341 and its gate is coupled to receive a write control signal W. To read data from the cell, the source-drain path of the data output transistor T10 is coupled to a data output (Data Bar out) node 342 and its gate is coupled to receive a read control signal R. When writing or reading data, the cell is addressed by applying a prescribed logic level (e.g., '1') to the respective X and Y address nodes 321 and 322, so as to turn on transistors T5, T6, T7 and T8. With transistors T5 and T7 turned on, the data node D is coupled to data input transistor T9, while the complementary data node D BAR is coupled to the data output transistor T10.

When performing a write to the cell, the write control input W to the gate of data input transistor T9 is asserted at a prescribed logical state (e.g., '1'), while the read control input R to the gate of data output transistor T10 is asserted at a complementary logical state (e.g., '0'), thereby turning on transistor T9 and holding transistor T10 off during a respective 'write cycle'. If the bit value applied to the Data in node 341 is a '1', the resulting '1' at data node D turns on transistor T3, thereby coupling the complementary data node D BAR to GND or '0'. Namely, the data line 331 is at the input data value '1', while the complementary data line D BAR 332 is at a logical '0' value. On the other hand, if the bit value applied to the Data in node 341 is a '0', the resulting '1' at data node D turns transistor T3 off, so that complementary data node D BAR is at a logical '1'. In this case, the data line 331 is at the input data value '0', while the complementary data line D BAR 332 is at a logical '1' value.

To read data from the memory cell 310, the read control input-R to the gate of data input transistor T10 is asserted at a prescribed logical state (e.g., '1'), while the write control input W to the gate of data input transistor T9 is asserted at a prescribed complementary logical state (e.g., '0'), thereby turning on transistor T10 and holding transistor T9 off. Since each of transistors T5, T6, T7 and T8 is turned on, then during this 'read cycle', whatever bit value is stored in the memory cell will be coupled to Data line 331, while its complement will be coupled to Data BAR line 332.

To enable the data bit stored in the memory cell 310 to be compared with a prescribed 'comparison' or 'reference' bit value, the memory cell includes a bit value comparator logic circuit 360, that is coupled to the data nodes of the cell, and to comparison bit lines 361 and 362. The bit value comparator 360 may comprise an exclusive NOR circuit, containing first and second pairs of sense transistors T11–T13 and T12–T14, having their drain-source paths coupled in circuit between a reference potential node (e.g., GND) and a 'MATCH' line 363, that is wire-AND coupled to other cells of the same data word. The gate of transistor T13 is used to sense the data node D of the memory cell 310. On the complementary side, the gate of transistor T14 is used to sense the data node D BAR of the memory cell 310.

The compare and compare complement bit values are coupled directly to the gate of transistor T12 and to the gate of transistor T11 by way of comparison bit lines 361 and 362, as shown. As in a conventional CAM, the match line 363 is charged to a prescribed high level. Since the gate of the transistor T13 is coupled to the data node D and the gate of the complementary sense transistor T14 is coupled to the data node D BAR of the memory cell, a 'match' will occur only if the stored bit and the comparison bit have the same value.

Since the connection of lines 361 and 362 to the match logic does not involve the use of a connection between the data lines 321 and 322 and the comparison circuit 360, accessing the data read and write paths for the memory cell during a compare operation is not required. This means that a read cycle and a comparison cycle may be performed simultaneously during the same cycle, without one affecting the other. In the operation of a conventional CAM, the read and compare operations are performed mutually exclusively from a memory cell write cycle, so as to ensure proper operation of the memory cell. However, since the CAM cell of FIG. 4 allows read and compare cycles to be performed simultaneously, rather than having to be executed during separate cycles that are mutually exclusive of each other, this dual operation bit cell is able to reduce the memory cycle time of a conventional CAM, as described in the above-referenced application. This performance improvement is especially useful in the packet switch buffer architecture of the present invention.

Figure 6:
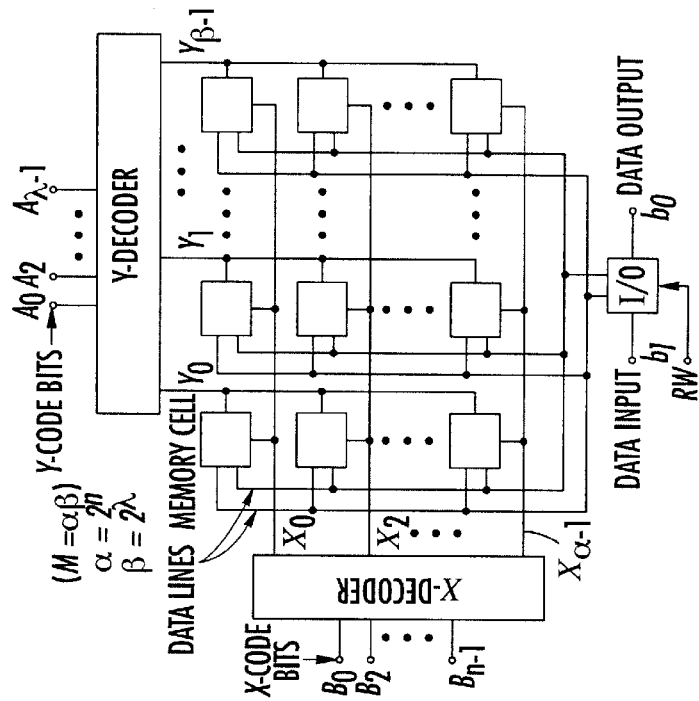
FIG. 6 diagrammatically illustrates the general architecture of a random access memory.
Figure 5:
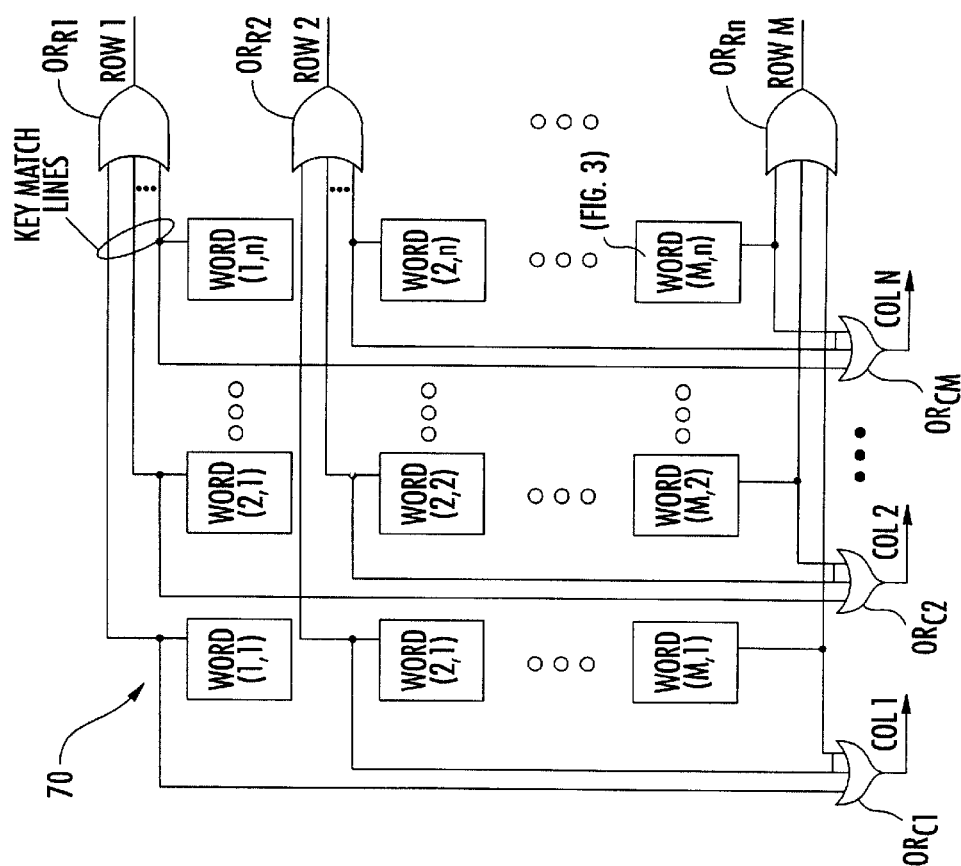
FIG. 5 diagrammatically illustrates an array of dual key buffer address pointer words within the dual key CAM of FIG. 2.
Figure 7:
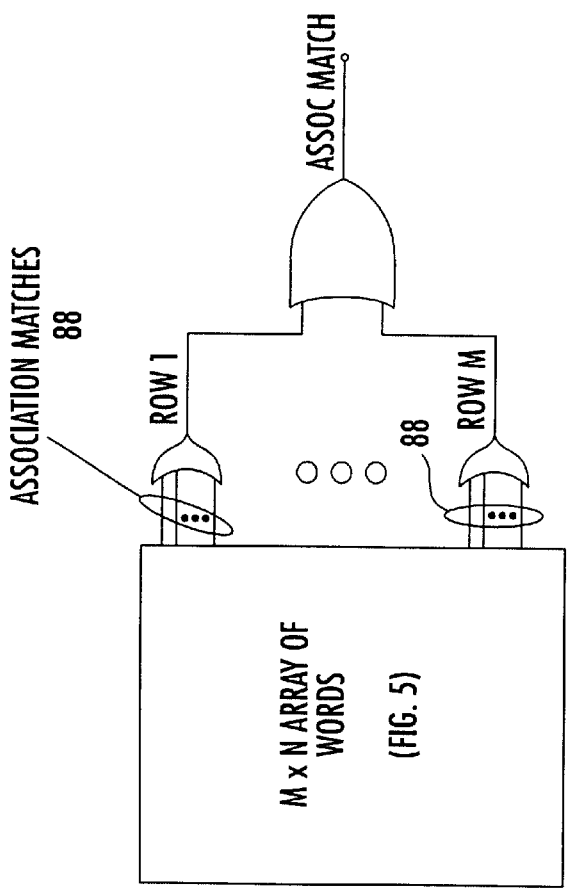
FIG. 7 shows the manner of logically ORing rows of association match outputs of the dual key CAM of FIG. 2.

As pointed out above, within the CAM 70, the dual key buffer address pointer words are organized into an array of rows and columns of words, diagrammatically illustrated in FIG. 5 as an (m, n) array of WORDs: WORD(1,1), . . . WORD(m,n), which is similar to arrays employed in random access memories (a non-limiting example of which is shown in FIG. 6), and is effective to reduce the complexity of address decoders for read/write access and data association. As shown in the word array of FIG. 5, all of the key match outputs 79 of a respective row $R_i$ (i=1 to M) of words are coupled to a respective row OR gate $OR_{Ri}$, and all of the key match outputs 79 of a respective column $C_i$ of words are coupled to a respective column OR gate $OR_{Ci}$, to form row and column addresses. As a result, that dual key buffer address pointer word that produces a match for the first key field search will produce an output (logical '1') at a single row and a single column OR gate output, which is used as the read row and column address, as described above. The outputs of all other OR gates will be zero. Since the second search determines only whether or not a match exists for the association field derived from the first search, it does not require that the location of the word producing the match (if any) be identified. As a result, as diagrammatically illustrated in FIG. 7, the association match outputs 88 can be simply ORed together (in either rows or columns, rows being shown in FIG. 7), and then OR all of the (respective rows or columns).

In operation, when a received packet is written into the output packet buffer 30, the K bit key field and the N bit address association field of the packet's K+N buffer address pointer word that has been loaded into the key word data write register 90 are written simultaneously into the CAM array 70, so that their write and address lines will all be driven together. In addition, as described above, the CAM sets an 'occupied' tag in the address generation logic (different than data valid flip-flop 230) to indicate that the physical storage location of the CAM array into which the buffer address pointer word has been loaded is occupied, and therefore currently unavailable to store a new buffer address pointer word.

To read out a packet from the output packet buffer 30, the key comparison word register 80 is loaded with the K bit key reference word from the packet buffer access controller 25, and then applied therefrom to the CAM's key compare input port 71, to initiate the first key field search. This causes the KEY MATCH output of the buffer address pointer word containing the matching key field to change state (e.g., go high) at output port 79, and thereby provide a load signal to the read address register 140. The row and column address of the location within the CAM array of the buffer address pointer word with the matching key are supplied via CAM output port 78 to the read address register 140. Via 2:1 multiplexer 125, the row and column address of the matched-key address pointer word is coupled to the association field row and column input port 77, in conjunction with the second search.

As pointed out above, this second search is operative to simultaneously reading out the address field (so that the packet can be read out from the packet buffer 30 and supplied to a switch output port), and to perform a compare operation for the address field (to determine whether there is another valid address pointer word in the CAM containing the same address field). Namely, during this read and compare operation, the matching address pointer word's association field is read out via port 75 and coupled over address link 55 to the address port 35 of output packet buffer 30.

It is also loaded into the association field comparison register 100, so as to be applied to the N bit wide association compare input port 74. To search the entire CAM for any other valid buffer address pointer word containing this address association field. If no match is found, the association match output port 88 goes low.

The aggregation of association match lines 88 for all K+N bit words within the CAM are used to generate the 'free' indicator 56. If all match lines 88 are low after the $2^{nd}$ search used to find other instances of the same N-bit packet address, FREE is asserted. Should a match be found, then at least one other K+N bit word contains the same N-bit address and the match line 88 will be asserted, causing the 'free' 56 line not to be asserted. This indicates pending multi-cast destinations for the packet.

As will be appreciated from the foregoing description, size and energy consumption shortcomings of conventional data storage and distribution subsystems are effectively obviated by the output centric packet switch architecture of the invention, which employs a dual key-based content addressable memory (CAM)-based data storage management mechanism, to control the storage and distribution of received data packets to one or more output ports of a P input port, M output port packet switch. By storing dual field buffer address pointer words containing a pair of associated or companion fields that identify a data packet to be delivered to a switch output port, on the one hand, and address of a single one of the storage locations of the packet buffer in which the data packet is stored, on the other hand, the CAM effectively performs indirect addressing of the output buffer, so that the size of the packet buffer can be significantly reduced.

Moreover, because the CAM is configured of memory cells that allow simultaneous read and compare operations, the dual field approach of the invention enables the CAM to rapidly read and indicate availability of buffer addresses. During a first portion of the dual CAM search, a packet request key is coupled to key fields of all address pointer words stored in the CAM, to thereby identify the location of a matching key field, so that the matching key field's companion address field can be readily accessed. Then, during a second portion of the dual CAM search, the accessed address field is read out to access a data packet stored in the packet buffer, and also simultaneously coupled to address fields of all the address pointer words stored in the CAM. This enables the CAM to immediately output a signal indicating whether the accessed address field is contained in the address field of another address pointer word stored in the CAM, and thereby whether or not the buffer address from which the packet has been read out is available to store a new packet.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. For use with a communication system in which a data packet is to be multicast to a plurality of recipients, a method of buffering and controllably supplying said data packet for delivery to multiple ones of a plurality of output ports associated with said recipients comprising the steps of:
   (a) storing said data packet in only a single data packet storage location of a data packet buffer;
   (b) storing, in a content-addressable memory, a plurality of respectively different address pointer words, each address pointer word containing a respectively different key field that is used to identify one of said plurality of output ports, and an address field that identifies said single data packet storage location of said packet buffer in which said data packet is stored;
   (c) coupling a key to said respectively different key fields of said respectively different address pointer words stored in said content addressable memory, so as to access contents of the address field of an address pointer word whose key field matches said key;
   (d) reading said data packet from said single data packet storage location of said packet buffer in accordance with said address field contents accessed in step (c); and
   (e) coupling said address field contents accessed in step (c) to the address fields of said respectively different address pointer words stored in said content-addressable memory to determine whether said single data packet storage location of said data packet buffer is available to store a new data packet.

2. A method according to claim 1, wherein steps (d) and (e) are conducted during a common memory cycle for said content-addressable memory.

3. A method according to claim 1, wherein step (e) comprises generating a signal representative whether or not said accessed address field contents are contained in the address field of another address pointer word.

4. A method according to claim 1, wherein step (e) comprises generating a signal representative of the availability of said single data packet storage location of said packet buffer to store a new data packet, in accordance with whether or not said address of said data packet single storage location of said packet buffer is contained in another address pointer word stored in said content-addressable memory.

5. A method according to claim 1, wherein said content-addressable memory comprises a data bit storage cell having a data input through which a data bit is written into said data bit storage cell, a data output through which a data bit is read out of said data bit storage cell, and an address input through which said data bit storage cell is selectively accessed, and a data bit comparator coupled to said data bit storage cell and being configured to determine whether the data bit stored in said data bit storage cell matches a reference data bit during a read cycle for said data bit storage cell.

6. A content-addressable memory having a plurality of storage regions that store respectively different address pointer words, a respective storage region containing:
a first plurality of content addressable memory cells, the contents of which are associated with a first field of a respective address pointer word that identifies data to be accessed from a storage location in a memory; and
a second plurality of content addressable memory cells, the contents of which are associated with a second field of said respective address pointer word that identifies the address of said storage location in said memory, and wherein
respectively different address pointer words stored in multiple ones of said plurality of storage regions of said content addressable memory contain respectively different first fields associated with respectively different ones of multiple instances of accessing said data from said storage location in said memory, and a common second field that identifies the address of said storage location in said memory for each of said multiple instances of accessing said data from said storage location in said memory.

7. A content addressable memory according to claim 6, wherein each of said first plurality of content addressable memory cells is configured to compare contents stored therein with a data access key associated with data to be accessed from said storage location in said memory, and to selectively read out contents of said second plurality of content addressable memory cells to address said storage location in said memory, in accordance with whether or not there is a match between contents stored in said first plurality of content addressable memory cells and said data access key.

8. A content addressable memory according to claim 7, wherein each of said plurality of storage regions is further configured to compare contents stored therein with said read out contents of said second plurality of content addressable memory cells, and to output a signal indicating whether or not said storage location of said memory is available for storage of new data, in accordance with whether or not another of said plurality of storage regions contains said common second field of said respective address pointer word that identifies said address of said storage location in said memory.

9. A content addressable memory according to claim 6, wherein a respective one of said second plurality of content addressable memory cells comprises a data bit storage cell having a data input through which a data bit is written into said data bit storage cell, a data output through which a data bit is read out of said data bit storage cell, and an address input through which said data bit storage cell is selectively accessed, and a data bit comparator coupled to said data bit storage cell and being configured to determine whether the data bit stored in said data bit storage cell matches a reference data bit during a read cycle for said data bit storage cell.

10. For use with a communication system in which packetized data is to be controllably multicast to a plurality of recipients in accordance with multicast criteria, an output port data distribution architecture for buffering and controllably supplying packetized data for delivery to multiple ones of a plurality of output ports associated with said recipients comprising:
a packet buffer containing a plurality of storage locations that store data packets intended for delivery to one or more of said plurality of output ports;
a content-addressable memory containing a plurality of storage regions that store respectively different address pointer words, each address pointer word containing a respectively different key field that is used to identify a data packet to be delivered to one of said plurality of output ports, and an address field that identifies the address of one of said plurality of storage locations of said packet buffer in which said data packet is stored; and
a packet buffer access controller, which is operative to couple a key to key fields of address pointer words of said plural storage regions of said content-addressable memory, and thereby access contents of the address field of an address pointer word whose key field contains said key, the accessed address field contents being coupled to read out a data packet stored in one of said plurality of storage locations of said packet buffer, said accessed address field contents being coupled to the address fields of address pointer words stored in said content-addressable memory, and wherein said content-addressable memory is operative to output a signal representative whether said accessed address field contents are contained in the address field of another address pointer word stored in said content-addressable memory.

11. An output port data distribution architecture according to claim 10, wherein said content-addressable memory is operative to output a signal indicating whether or not said storage location of said packet buffer is available for storage of a new data packet, in accordance with whether or not said address of said storage location of said packet buffer is contained in another address pointer word stored in said content-addressable memory.

12. An output port data distribution architecture according to claim 10, wherein said packet buffer access controller is operative to cause a data packet, that is to be multicast to multiple output ports, to be stored in a single storage location of said packet buffer, and to cause multiple address pointer words to be stored in said content-addressable memory, respective ones of said multiple address pointer words containing different key fields for respectively different ones of said multiple output ports, and the same address field that identifies the address of said single data packet storage location of said packet buffer storing said data packet to be multicast.

13. An output port data distribution architecture according to claim 10, wherein said content-addressable memory contains a plurality of storage regions that store respectively different address pointer words, a respective storage region containing a first plurality of content addressable memory cells, the contents of which are associated with a first field of a respective address pointer word that identifies data to be accessed from a storage location in said packet buffer, and a second plurality of content addressable memory cells, the contents of which are associated with a second field of said respective address pointer word that identifies the address of said storage location in said packet buffer.

14. An output port data distribution architecture according to claim 13, wherein respectively different address pointer words stored in multiple ones of said plurality of storage regions of said content addressable memory contain respectively different first fields associated with respectively different ones of multiple instances of accessing said data from said storage location in said packet buffer, and a common second field that identifies the address of said storage location in said packet buffer for each of said multiple instances of accessing said data from said storage location in said packet buffer.

15. An output port data distribution architecture according to claim 14, wherein each of said first plurality of content addressable memory cells is configured to compare contents stored therein with a packet access key associated with data to be accessed from said storage location in said packet buffer, and to selectively read out contents of said second plurality of content addressable memory cells to address said storage location in said packet buffer in accordance with whether or not said packet access key matches said contents of said first plurality of content addressable memory cells.

16. An output port data distribution architecture according to claim 15, wherein each of said plurality of storage regions is further configured to compare contents stored therein with said read out contents of said second plurality of content addressable memory cells to determine whether any other of said plurality of storage regions contains said common second field of said respective address pointer word that identifies said address of said storage location in said packet buffer.

17. An output port data distribution architecture according to claim 16, wherein a respective storage region of said content-addressable memory is configured to output a signal indicating whether or not said storage location of said packet buffer is available for storage of new data, in accordance with whether another of said plurality of storage regions contains said common second field of said respective address pointer word.

18. An output port data distribution architecture according to claim 10, wherein a respective one of said second plurality of content addressable memory cells comprises a data bit storage cell having a data input through which a data bit is written into said data bit storage cell, a data output through which a data bit is read out of said data bit storage cell, and an address input through which said data bit storage cell is selectively accessed, and a data bit comparator coupled to said data bit storage cell and being configured to determine whether the data bit stored in said data bit storage cell matches a reference data bit during a read cycle for said data bit storage cell.

19. For use with a communication system in which a data packet is to be multicast to a plurality of recipients, a method of buffering and controllably supplying said data packet for delivery to multiple ones of a plurality of output ports associated with said recipients comprising the steps of:

(a) storing said data packet to be multicast in only a single data packet storage location of a data packet buffer;

(b) storing, in a content-addressable memory, a plurality of respectively different address pointer words, containing respectively different first fields, associated with multicasting of said data packet to multiple ones of said plurality of output ports, and a common address field that identifies said single data packet storage location of said packet buffer in which said data packet to be multicast is stored;

(c) coupling respectively different keys to said respectively different first fields of said respectively different address pointer words stored in said content addressable memory, to read out contents of said common address field for application to said packet buffer, and thereby cause said data packet to be read out from said single data packet storage location of said packet buffer and multicast to said multiple ones of said plurality of output ports; and (d) in the course of reading out said contents of said common address field for application to said packet buffer in step (c), coupling said contents of said common address field to address fields of all of the address pointer words stored in said content addressable memory, to determine whether said data packet has been multicast in accordance with each address pointer word stored in said content addressable memory.

20. An output port centric digital data management architecture for a high speed packet switch comprising a content addressable memory which stores address information for controlling multiple accesses to the same data packet stored in a single memory address of a data packet output buffer, to selectively read out therefrom said same data packet to a plurality of ports of the switch, said content addressable memory being configured to store respectively different buffer address pointer words that identify said same data packet to be delivered to selected ones of said plurality of switch output ports, and point to the address of said single storage location of said packet buffer.

21. An output port centric digital data management architecture according to claim 20, wherein a respective address pointer word of said content addressable memory contains a first field that identifies said same data packet, and a companion address field that points to the address of said single storage location of said data packet output buffer, and wherein said content addressable memory is operative, during a first portion of a search thereof, to couple a packet request key to first fields of all address pointer words stored therein, and to cause information associated with a matching first field to access said matching first field's companion address field, said accessed companion address field being employed during a second portion of said search to read out said data packet from said single storage location of said packet output buffer, and to also be simultaneously coupled to address fields of all the address pointer words stored in said content addressable memory, in response to which said content addressable memory outputs a signal indicating whether the accessed address field is contained in another address pointer word stored therein, and thereby whether the address of said single output packet buffer storage location is available to store a new packet.

22. A content-addressable memory comprising an array of storage regions that store multibit words, each storage region being formed of a first plurality of content addressable memory cells, the contents of which are associated with a first field of a respective multibit word, and a second plurality of content addressable memory cells, the contents of which are associated with a second field of said respective multibit word, and wherein respectively different words stored in multiple ones of said plurality of storage regions of said content addressable memory contain respectively different first fields, and a common second field.

23. A content addressable memory according to claim 22, wherein said first plurality of content addressable memory cells of a respective storage region is configured to compare contents stored therein with a key supplied thereto, and to selectively read out contents of said second plurality of content addressable memory cells of said respective storage region in accordance with whether or not there is a match between contents of said first plurality of content addressable memory cells and said key.

24. A content addressable memory according to claim 23, wherein each of said plurality of storage regions is further configured to compare contents stored therein with said read out contents of said second plurality of content addressable memory cells to determine whether any other of said plurality of storage regions contains said common second field.

25. A content addressable memory according to claim 22, wherein a respective one of said second plurality of content addressable memory cells comprises a data bit storage cell having a data input through which a data bit is written into said data bit storage cell, a data output through which a data bit is read out of said data bit storage cell, and an address input through which said data bit storage cell is selectively accessed, and a data bit comparator coupled to said data bit storage cell and being configured to determine whether the data bit stored in said data bit storage cell matches a reference data bit during a read cycle for said data bit storage cell.

* * * * *

UNITED STATES PATENT AND TRADEMARK OFFICE
CERTIFICATE OF CORRECTION

PATENT NO. : 6,606,317 B1  
DATED : August 12, 2003  
INVENTOR(S) : Edward R. Beadle and John F. Dishman It is certified that error appears in the above-identified patent and that said Letters Patent is hereby corrected as shown below:

Title page,
Item [57], ABSTRACT, delete ABSTRACT and insert new ABSTRACT:
-- A data management architecture for a high speed packet switch has a dual key-based content addressable memory (CAM)-based buffer access control mechanism that stores relatively long data packets for delivery to multiple output ports of the switch. The CAM stores multiple address pointer words, each having a key field to identify a data packet, and an address field to identify the address of the location of the packet buffer in which the data packet is stored. During a CAM search, a packet request key is coupled to the key fields of all address pointer words stored in the CAM. The location of the matching key is used to access to key field's companion address field in its address pointer word to access a data packet stored in the packet buffer, and to address fields of all address pointer words stored in the CAM. The CAM outputs a signal that indicates whether or not the buffer address from which the packet has been accessed is free to store new data. --

Column 6,
Line 17, delete "the-packet" insert -- the packet --

Column 12,
Line 31, delete "(m, n)" insert -- (mxn) --

Signed and Sealed this

Ninth Day of March, 2004

JON W. DUDAS  
*Acting Director of the United States Patent and Trademark Office*